US006873953B1

(12) United States Patent
Lennig

(10) Patent No.: US 6,873,953 B1
(45) Date of Patent: Mar. 29, 2005

(54) PROSODY BASED ENDPOINT DETECTION

(75) Inventor: Matthew Lennig, Palo Alto, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/576,116

(22) Filed: May 22, 2000

(51) Int. Cl.[7] ................................................ G10L 15/04
(52) U.S. Cl. ....................................... 704/253; 704/248
(58) Field of Search ................................ 704/251, 252, 704/253, 254, 247, 248, 249, 250, 207, 208, 209, 210, 218, 219, 214, 215, 226, 231, 256, 261, 267, 268

(56) References Cited

U.S. PATENT DOCUMENTS

| | | | | |
|---|---|---|---|---|
| 5,097,509 A | | 3/1992 | Lennig | |
| 5,692,104 A | * | 11/1997 | Chow et al. | 704/253 |
| 5,732,392 A | * | 3/1998 | Mizuno et al. | 704/233 |
| 6,067,520 A | * | 5/2000 | Lee | 704/270 |
| 6,480,823 B1 | * | 11/2002 | Zhao et al. | 704/226 |

FOREIGN PATENT DOCUMENTS

| | | | | |
|---|---|---|---|---|
| EP | 0 424 071 A2 * | 4/1991 | | G10L/5/06 |
| JP | 403245700 A * | 11/1991 | | G10L/3/00 |

OTHER PUBLICATIONS

Deller et al., Discreate–Time Processing of Speech Signals; IEEE press Marketting, 1993, Pares 111–114.*

Lori F. Lamel, et al., "An Improved Endpoint Dectector for Isolated Word Recognition," IEEE Transactions on Acoustics, Speech and Signal Processing, Aug., 1981, Vol. ASSP–29, No. 4, pp. 777–785.

* cited by examiner

*Primary Examiner*—Abul K. Azad
(74) *Attorney, Agent, or Firm*—Blakely, Sokoloff, Taylor & Zafman LLP

(57) ABSTRACT

A method and apparatus are provided for performing prosody based endpoint detection of speech in a speech recognition system. Input speech represents an utterance, which has an intonation pattern. An end-of-utterance condition is identified based on prosodic parameters of the utterance, such as the intonation pattern and the duration of the final syllable of the utterance, as well as non-prosodic parameters, such as the log energy of the speech.

8 Claims, 5 Drawing Sheets

PROSODY BASED ENDPOINT DETECTION

FIELD OF THE INVENTION

The present invention pertains to endpoint detection in the processing of speech, such as in speech recognition. More particularly, the present invention relates to the detection of the endpoint of an utterance using prosody.

BACKGROUND OF THE INVENTION

In a speech recognition system, a device commonly known as an "endpoint detector" separates the speech segment(s) of an utterance represented in an input signal from the non-speech segments, i.e., it identifies the "endpoints" of speech. An "endpoint" of speech can be either the beginning of speech after a period of non-speech or the ending of speech before a period of non-speech. An endpoint detector may be either hardware-based or software-based, or both. Because endpoint detection generally occurs early in the speech recognition process, the accuracy of the endpoint detector is crucial to the performance of the overall speech recognition system. Accurate endpoint detection will facilitate accurate recognition results, while poor endpoint detection will often cause poor recognition results.

Some conventional endpoint detectors operate using log energy and/or spectral information as knowledge sources. For example, by comparing the log energy of the input speech signal against a threshold energy level, an endpoint can be identified. An end-of-utterance can be identified, for example, if the log energy drops below the threshold level after having exceeded the threshold level for some specified length of time. However, this approach does not take into consideration many of the characteristics of human speech. As a result, this approach is only a rough approximation, such that purely energy-based endpoint detectors are not as accurate as desired.

One problem associated with endpoint detection is distinguishing between a mid-utterance pause and the end of an utterance. In making this determination, there is generally an inherent trade-off between achieving short latency and detecting the entire utterance.

SUMMARY OF THE INVENTION

A method and apparatus for performing endpoint detection are provided. In the method, a speech signal representing an utterance is input. The utterance has an intonation, based on which the endpoint of the utterance is identified. In particular embodiments, endpoint identification may include referencing the intonation of the utterance against an intonation model.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for detecting endpoints of speech using prosody are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

As described in greater detail below, an end-of-utterance condition can be identified by an endpoint detector based, at least in part, on the prosody characteristics of the utterance. Other knowledge sources, such as log energy and/or spectral information may also be used in combination with prosody. Note that while endpoint detection generally involves identifying both beginning-of-utterance and end-of-utterance conditions (i.e., separating speech from non-speech), the techniques described herein are directed primarily toward identifying an end-of-utterance condition. Any conventional endpointing technique may be used to identify a beginning-of-utterance condition, which technique(s) need not be described herein. Nonetheless, it is contemplated that the prosody-based techniques described herein may be extended or modified to detect a beginning-of-utterance condition as well. The processes described herein are real-time processes that operate on a continuous audio signal, examining the incoming speech frame-by-frame to detect an end-of-utterance condition.

"Prosody" is defined herein to include characteristics such as intonation and syllable duration. Hence, an end-of-utterance condition may be identified based, at least in part, on the intonation of the utterance, the duration of one or more syllables of the utterance, or a combination of these and/or other variables. For example, in many languages, including English, the end of an utterance often has a generally decreasing intonation. This fact can be used to advantage in endpoint detection, as further described below. Various types of prosody models may be used in this process. This prosody based approach, therefore, makes use of more of the inherent features of human speech than purely energy-based approaches and other more traditional approaches. Among other advantages, the use of intonation in the endpoint detection process helps to more accurately distinguish between a mid-utterance pause and an end-of-utterance condition, without adversely affecting latency. Consequently, the prosody based approach provides more accurate endpoint detection without adversely affecting latency and thereby facilitates improved speech recognition.

Figure 1:
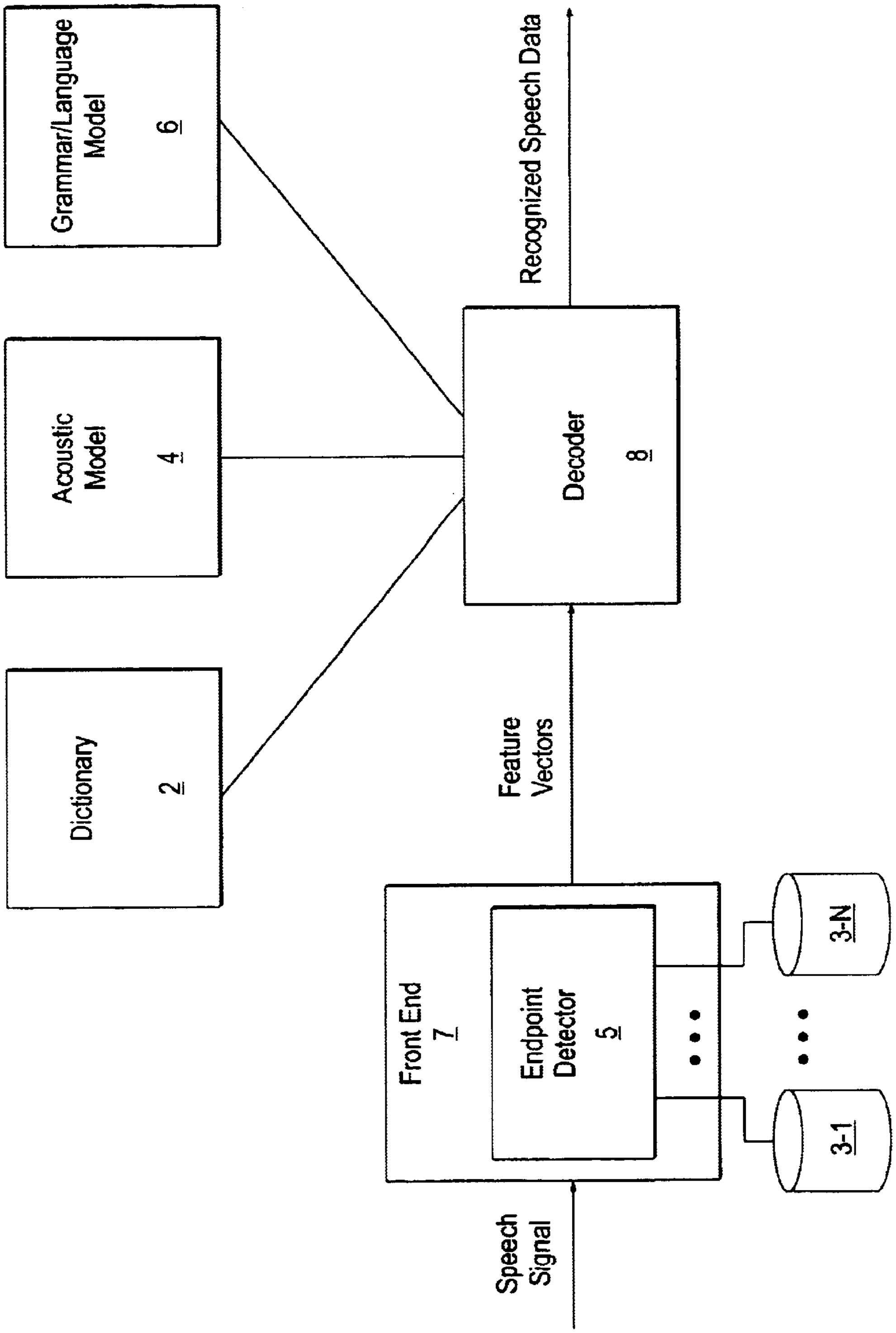
FIG. 1 is a block diagram of a speech recognition system.

FIG. 1 shows an example of a speech recognition system in which the present endpoint detection technique can be implemented. The illustrated system includes a dictionary 2, a set of acoustic models 4, and a grammar/language model 6. Each of these elements may be stored in one or more conventional storage devices. The dictionary 2 contains all of the words allowed by the speech application in which the system is used. The acoustic models 4 are statistical representations of all phonetic units and subunits of speech that may be found in a speech waveform. The grammar/language model 6 is a statistical or deterministic representation of all possible combinations of word sequences that are allowed by the speech application. The system further includes an audio front end 7 and a speech decoder 8. The audio front end includes an endpoint detector 5. The endpoint detector 8 has access to one or more prosody models 3-1 through 3-N, which are discussed further below.

An input speech signal is received by the audio front end 7 via a microphone, telephony interface, computer network interface, or any other suitable input interface. The audio front end 7 digitizes the speech waveform (if not already digitized), endpoints the speech (using the endpoint detector 5), and extracts feature vectors (also known as features, observations, parameter vectors, or frames) from the digitized speech. In some implementations, endpointing precedes feature extraction, while in other implementations feature extraction may precede endpointing. To facilitate description, the former case is assumed henceforth in this description.

Thus, the audio front end 7 is essentially responsible for processing the speech waveform and transforming it into a sequence of data points that can be better modeled by the acoustic models 4 than the raw waveform. The extracted feature vectors are provided to the speech decoder 8, which references the feature vectors against the dictionary 2, the acoustic models 4, and the grammar/language model 6, to generate recognized speech data. The recognized speech data may further be provided to a natural language interpreter (not shown), which interprets the meaning of the recognized speech.

The prosody based endpoint detection technique is implemented within the endpoint detector 5 in the audio front end 7. Note that audio front ends which perform the above functions but without a prosody based endpoint detection technique are well known in the art. The prosody based endpoint detection technique may be implemented using software, hardware, or a combination of hardware and software. For example, the technique may be implemented by a microprocessor or Digital Signal Processor (DSP) executing sequences of software instructions. Alternatively, the technique may be implemented using only hardwired circuitry, or a combination of hardwired circuitry and executing software instructions. Such hardwired circuitry may include, for example, one or more microcontrollers, Application Specific Integrated Circuits (ASICs), Programmable Logic Devices (PLDs), Field Programmable Gate Arrays (FPGAs), A/D converters, and/or other suitable components.

Figure 2:
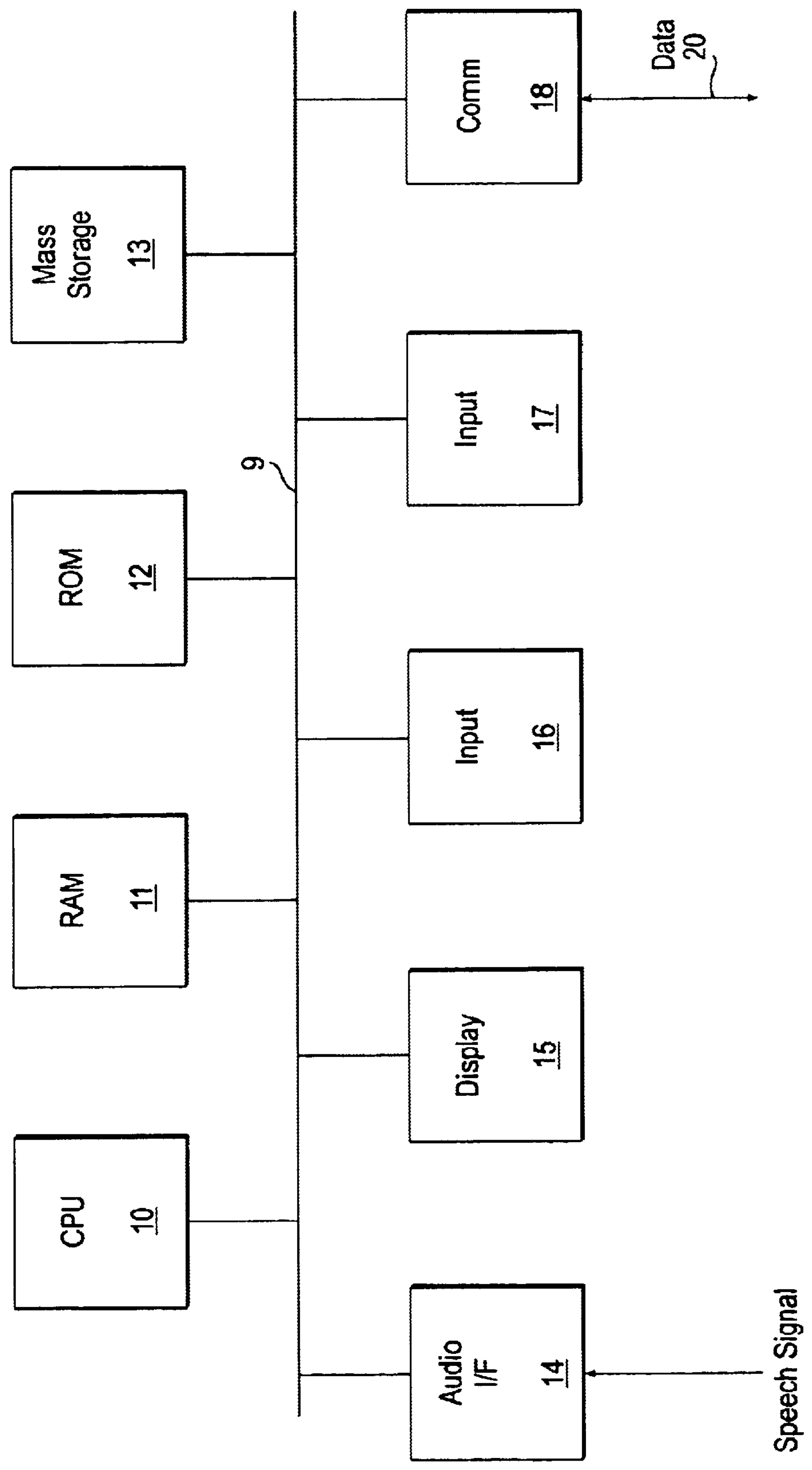
FIG. 2 is a block diagram of a processing system that may be configured to perform speech recognition.

The system of FIG. 1 may be implemented in a conventional processing system, such as a personal computer (PC), workstation, hand-held computer, Personal Digital Assistant (PDA), etc. Alternatively, the system may be distributed between two or more such processing systems, which may be connected on a network. FIG. 2 is a high-level block diagram of an example of such a processing system. The processing system of FIG. 2 includes a central processing unit (CPU) 10 (e.g., a mnicroprocessor), random access memory (RAM) 11, read-only memory (ROM) 12, and a mass storage device 13, each connected to a bus system 9. Mass storage device 13 may include any suitable device for storing large volumes of data, such as magnetic disk or tape, magneto-optical (MO) storage device, or any of various types of Digital Versatile Disk (DVD) or compact disk (CD) based storage, flash memory, etc. The bus system 9 may include one or more buses connected to each other through various bridges, controllers and/or adapters, such as are well-known in the art. For example, the bus system 9 nay include a system bus that is connected through an adapter to one or more expansion buses, such as a Peripheral Component Interconnect (PCI) bus.

Also coupled to the bus system 9 are an audio interface 14, a display device 15, input devices 16 and 17, and a communication device 30. The audio interface 14 allows the computer system to receive an input audio signal that includes the speech signal. The audio interface 14 includes circuitry and (in some embodiments) software instructions for receiving an input audio signal which includes the speech signal, which may be received from a microphone, a telephone line, a network interface, etc., and for transferring such signal onto the bus system 9. Thus, prosody based endpoint detection as described herein may be performed within the audio interface 14. Alternatively, the endpoint detection may be performed within the CPU 10, or partly within the CPU 10 and partly within the audio interface 14. The audio interface may include one or more DSPs, general purpose microprocessors, microcontrollers, ASICs, PLDs, FPGAs, A/D converters, and/or other suitable components.

The display device 15 may be any suitable device for displaying alphanumeric, graphical and/or video data to a user, such as a cathode ray tube (CRT), a liquid crystal display (LCD), or the like, and associated controllers. The input devices 16 and 17 may include, for example, a conventional pointing device, a keyboard, etc. The communication device 18 may be any device suitable for enabling the computer system to communicate data with another processing system over a network via a data link 20, such as a conventional telephone modem, a wireless modem, a cable modem, an Integrated Services Digital Network (ISDN) adapter, a Digital Subscriber Line (DSL) modem, an Ethernet adapter, or the like.

Note that some of these components may be omitted in certain embodiments, and certain embodiments may include additional or substitute components that are not mentioned here. Such variations will be readily apparent to those skilled in the art. As an example of such a variation, the functions of the audio interface 14 and the communication device 18 may be provided in a single device. As another example, the peripheral components connected to the bus system 9 might further include audio speakers and associated adapter circuitry. As yet another example, the display device 15 may be omitted if the processing system has no direct interface to a user.

Prosody based endpoint detection may be based, at least in part, on the intonation of utterances. Of course, endpoint detection may also be based on other prosodic information and/or on non-prosodic information, such as log energy.

Figure 3:
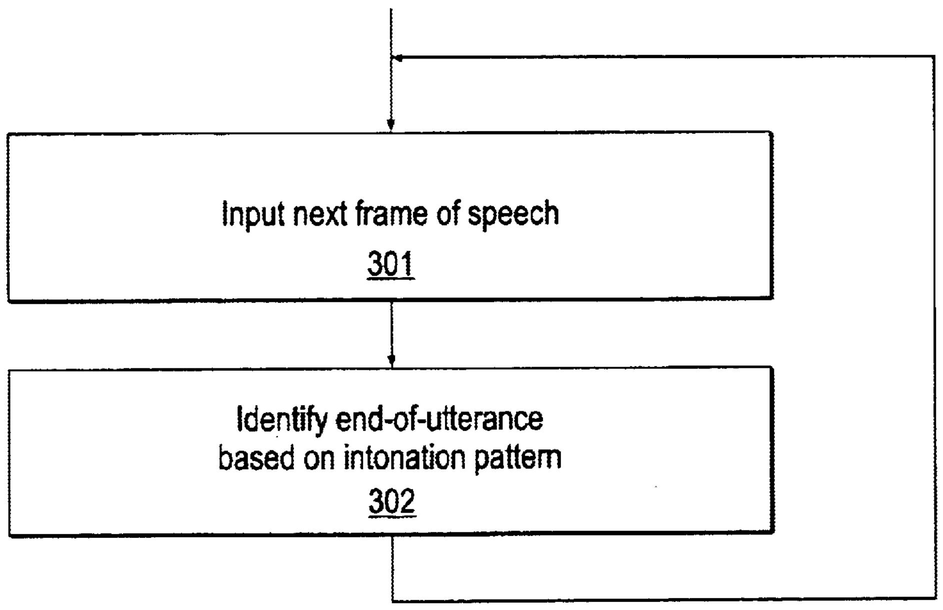
FIG. 3 is a flow diagram showing an overall process for performing endpoint detection using prosody.

FIG. 3 shows, at a high level, a process for detecting an end-of-utterance condition based on prosody, according to one embodiment. The next frame of speech representing at least part of an utterance is initially input to the endpoint detector 5 at 301. The end-of-utterance condition is identified at 302 based (at least) on the intonation of the utterance, and the routine then repeats. Note that this process and the processes described below are real-time processes that operate on a continuous audio signal, examining the incoming speech frame-by-frame to detect an end-of-utterance condition. For purposes of detecting an end-of-utterance condition, the time frame of this audio signal may be assumed to be after the start of speech.

As noted, other types of prosodic parameters and more traditional, non-prosodic knowledge sources can also be used to detect an end-of-utterance condition (although not so indicated in FIG. 3). A technique for combining multiple knowledge sources to make a decision is described in U.S. Pat. No. 5,097,509 of Lennig, issued on Mar. 17, 1992 ("Lennig"), which is incorporated herein by reference. In accordance with the present invention, the technique described by Lennig may be used to combine multiple prosodic knowledge sources, or to combine one or more prosodic knowledge sources with one or more non-prosodic knowledge sources, to detect an end-of-utterance condition. The technique involves creating a histogram, based on training data, for each knowledge source. Training data consists of both "positive" and "negative" utterances. Positive utterances are defined as those utterances which meet the criterion of interest (e.g., end-of-utterance), while negative utterances are defined as those utterances which do not. Each knowledge source is represented as a scalar value. The bin boundaries of each histogram partition the range of the feature into a number of bins. These boundaries are determined empirically so that there is enough resolution to distinguish useful differences in values of the knowledge source but so that there is a sufficient amount of data in each bin. The bins need not be of uniform width.

It may be useful to smooth the histograms, particularly when there is limited training data. One approach to doing so is "medians of three" smoothing, described in J. W. Tukey, "Smoothing Sequences," Exploratory Data Analysis, Addison-Wesley, 1977. In medians of three smoothing, starting at one end of the histogram and processing each bin in order until reaching the other end, the count of each bin is replaced by the median of the counts of that bin and the two adjacent bins. The smoothing is applied separately to the positive and negative bin counts.

At run time, a given knowledge source (e.g., intonation) is measured. The value of this knowledge source determines the histogram bin into which it falls. Suppose that bin is bin number K. Let A represent the number of positive training utterances that fell into bin K and let B represent the number of negative training utterances that fell into bin K. A probability score $P_1$ of this knowledge source is then computed as $P_1=A/(A+B)$, where $P_1$ represents the probability that the criterion of interest is satisfied given the current value of this knowledge source. The same process is used for each additional knowledge source. The probabilities of the different knowledge sources are then combined to generate an overall probability P as follows: $=(P_1{}w_1)(P_2{}w_2)(P_3{}w_3)\ldots(P_N{}w_N)$, where the "**" operator indicates exponentiation and $w_1$, $w_2$, $w_3$, etc. are empirically-determined, non-negative weights that sum to one.

Intonation of an utterance is one prosodic knowledge source that can be useful in endpoint detection. Various techniques can be used to determine the intonation. The intonation of an utterance is represented, at least in part, by the change in fundamental frequency of the utterance over time. Hence, the intonation of an utterance may be determined in the form of a pattern (an "intonation pattern") indicating the change in fundamental frequency of the utterance over time. In the English language, a generally decreasing fundamental frequency is more indicative of an end-of-utterance condition than a generally increasing fundamental frequency. Hence, a decline in fundamental frequency may represent decreasing intonation, which may be evidence of an end-of-utterance condition.

There are many possible approaches to mapping a declining fundamental frequency pattern into a scalar feature, for use in the above-described histogram approach. The intonation pattern may be, for example, a single computation based on the difference in fundamental frequency between two frames of data, or it may be based on multiple differences for three or more (potentially overlapping) frames within a predetermined time range. For this purpose, it may be sufficient to examine the most recent approximately 0.6 to 1.2 seconds or one to three syllables of speech.

One specific approach involves computing the smoothed first difference of the fundamental frequency. Let F(n) represent the fundamental frequency, F0, of frame n. Let F'(n)=F(n)−F(n−1) represent the first difference of F(n). Let f(n) aF'(n)−(1−a)f(n−1), where $0 \leqq a \leqq 1$, represent the smoothed first difference of F(n). The value of "a" is tuned empirically so that f(n) becomes as negative as possible when the F0 pattern declines at the end of an utterance. Use f(n) as an input feature to the histogram method. Note that when F(n) is undefined because it is in an unvoiced segment of speech, F(n) may be defined as F(n−1).

Other approaches could capture more information about the time evolution of the fundamental frequency pattern using techniques such as Hidden Markov Models, where the parameter f(n) is the observation parameter.

The intonation pattern may additionally (or alternatively) include the relationship between the current fundamental frequency and the fundamental frequency range of the speaker. For example, a drop in fundamental frequency to a value that is near the low end of the fundamental frequency range of the speaker may suggest an end-of-utterance condition. It may be desirable to treat as two distinct knowledge sources the change in fundamental frequency over time and the relationship between the current fundamental frequency and the speaker's fundamental frequency range. In that case, these two intonation-based knowledge sources may be combined using the above-described histogram approach, for purposes of detecting an end-of-utterance condition.

To apply the histogram approach to the latter-mentioned knowledge source, the low end of the speaker's fundamental frequency range is computed as a scalar. One way of doing this is simply to use the minimum observed fundamental frequency for the speaker. The fundamental frequency range of the speaker may be determined adaptively from utterances of the speaker earlier in a dialog. In one embodiment, the system asks the speaker a question specifically designed to elicit a response conducive to determining the low end of the speaker's fundamental frequency range. This may be a simple yes/no question, the response of which will normally contain the word "yes" or "no" with a falling intonation approaching the low end of the speaker's fundamental frequency range. The fundamental frequency of the vowel of the speaker's response may be used as an initial estimate of the low end of the speaker's fundamental frequency range. However this low end of the fundamental frequency range is estimated, designate it as C. Hence, the value input to the fundamental frequency range histogram may be computed as F0−C.

Any of various knowledge sources may be used as input in the histogram technique described above, to compute the probability P. These knowledge sources may include, for example, any one or more of the following: silence duration, silence duration normalized for peaking rate, f(n) as defined above, F0-C as defined above, final syllable duration, final syllable duration normalized for phonemic content, final syllable duration normalized for stress, or final syllable duration normalized for a combination of the foregoing parameters.

Figure 4:
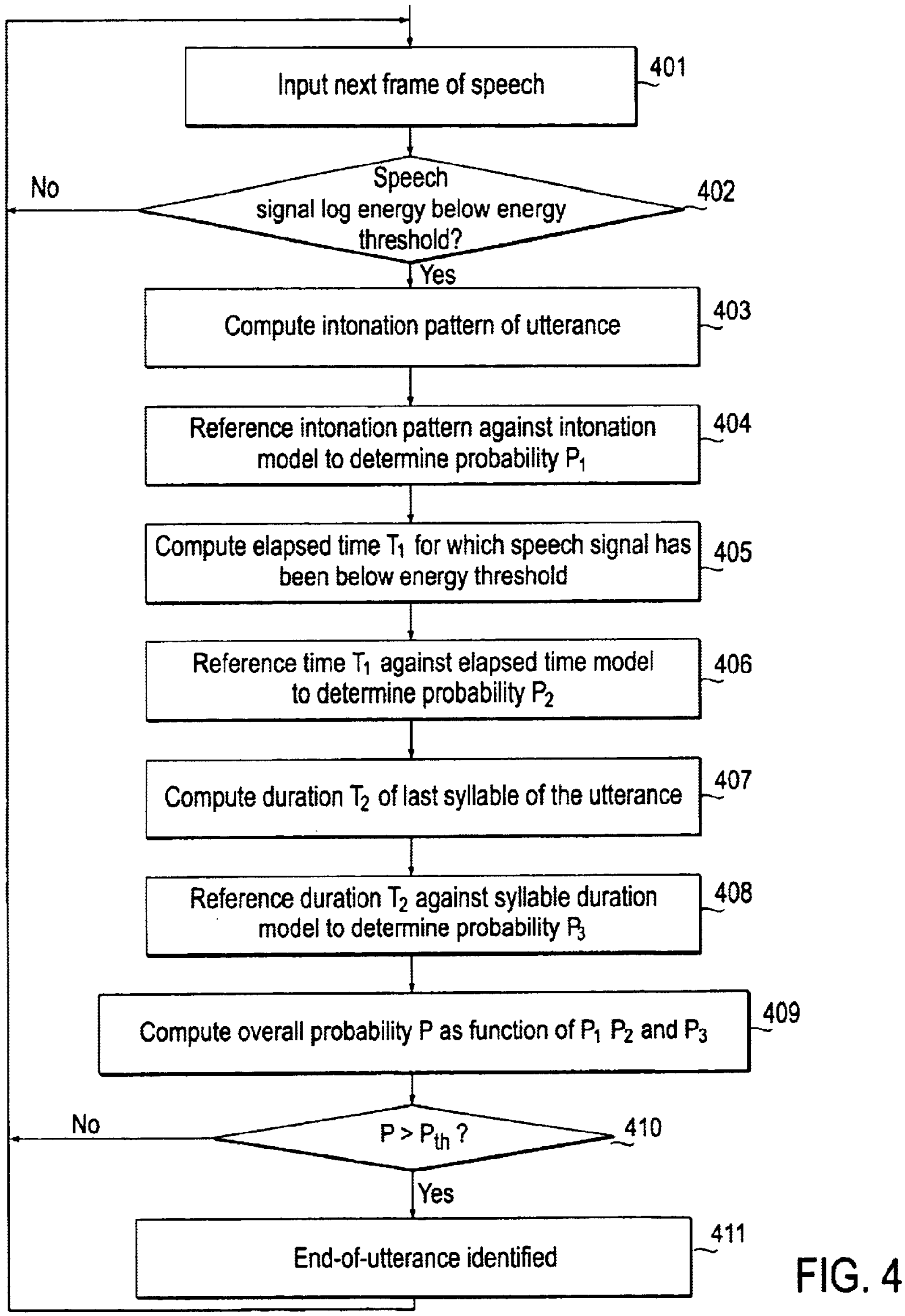
FIG. 4 is a flow diagram showing in greater detail the process of FIG. 3, according to one embodiment.

Various non-histogram based approaches can also be used to perform prosody based endpoint detection. FIG. 4 illustrates a non-histogram based approach for prosody based determination of an end-of-utterance condition, according to one embodiment, which may be implemented in the endpoint detector 5. Initially, the next frame of speech is input to the endpoint detector 5 at 401. It is next determined at 402 whether the log energy (the logarithm of the energy of the speech signal) is below a predetermined energy threshold level. This threshold level may be set dynamically and adaptively. The specific value of the threshold level may also depend on various factors, such as the specific application of the system and desired system performance, and is therefore not provided herein. If the log energy is not below the threshold level, the process repeats from 401. If the log energy is below the threshold level, then at 403 the intonation pattern of the utterance is determined, which may be done as described above.

Next, at 404 the intonation pattern is referenced against an intonation model to determine a preliminary probability $P_1$ that the end-f the utterance condition has been reached, given that intonation pattern. The intonation model may be one of prosody models 3-1 through 3-N in FIG. 1 and may be in the form of a histogram based on training data, such as described above. Other examples of the format of the intonation model are described below. In essence, this is a determination of whether the intonation pattern is suggestive of an end-of-utterance condition. As noted above, a generally decreasing intonation may suggest an end-of-utterance condition. Again, it maybe sufficient to examine the last approximately 0.6 to 1.2 seconds or one to three syllables of speech for this purpose.

As noted above, other intonation-based parameters (e.g., the relationship between the fundamental frequency and the speaker's fundamental frequency range) may be represented in the intonation model. Alternatively, such other parameters may be treated as separate knowledge sources and referenced against separate intonation models to obtain separate probability values.

Referring still to FIG. 4, at 405 the amount of time T which the speech signal has remained below the energy threshold level is computed. This amount of time $T_1$ is then referenced at 406 against a model of elapsed time to determine a second preliminary probability $P_2$ that the end-of-utterance has been reached, given the pause duration $T_1$. At 407, the normalized, relative duration $T_2$ of the final syllable of the utterance is computed. Although the duration of the final syllable of the utterance cannot actually be known before an end-of-utterance condition has been identified, this computation 407 may be based on the temporary assumption (i.e., only for purposes of this computation) that an end-of-utterance condition has occurred. Techniques for automatically determining the duration of a syllable of an utterance are well-known. Once computed, the duration $T_2$ is then referenced at 408 against a syllable duration model (e.g., another one of prosody models 311 through 3-N) to determine a third preliminary probability $P_3$ of end-of-utterance, given the normalized relative duration $T_2$ of the last syllable.

At 409, the overall probability P of end-of-utterance is computed as a function of $P_1$, $P_2$ and $P_3$, which may be, for example, a geometrically weighted average of $P_1$, $P_2$ and $P_3$. In this computation, each probability value $P_1$, $P_2$, and $P_3$ is raised to a power, so that the sum of these three probabilities equals one. At 410, the overall probability P is compared against a threshold probability level $P_{th}$. If P exceeds the threshold probability $P_{th}$ at 410, then an end-of-utterance is determined to have occurred at 411, and the process then repeats from 401. Otherwise, an end-of-utterance is not yet identified, and the process repeats from 401. The threshold probability $P_{th}$, as well as the specific or other function used to compute the overall probability P can depend upon various factors, such as the particular application of the system, the desired performance, etc.

Many variations upon this process are possible, as will be recognized by those skilled in the art. For example, the order of the operations mentioned above may be changed for different embodiments.

Referring again to operation 404 in FIG. 4, the intonation model may have any of a variety of possible forms, an example of which is a histogram based on training data. In yet another approach, the intonation model may be a regression model or a Gaussian distribution of training data, with an estimated mean and variance, against which the input data is compared to assign the probability values $P_1$. Parametric approaches such as these can optionally be implemented using a Hidden Markov Model to capture information about the time evolution of the intonation pattern.

As an example of a non-parametric approach, the intonation model may be a prototype function of declining fundamental frequency over time (i.e., representing known end-of-utterance conditions). Thus, the operation 404 may be accomplished by computing the correlation between the observed intonation pattern and the prototype function. In this approach, it may be useful to express the prototype function and the observed intonation values as percentage increases or decreases in fundamental frequency, rather than as absolute values.

As yet another example, the intonation model may be a simple look-up table of intonation patterns (i.e., functions or values) vs. probability values $P_1$. Interpolation may be used to map input values that do not exactly match a value in the table.

Referring to operation 406 in FIG. 4, the model of elapsed time (during which the speech has exhibited low energy) may also include a histogram constructed from training data, or another format such as described above. Since different speech recognition grammars may give rise to different post-speech timeout parameters, it may be useful to introduce an additive bias that is adjustable through tuning, to the computation of probability $P_2$. This additive bias may be subtracted from the observed length of time $T_1$ of low energy speech before using the result to compute probability $P_2$ using the histogram approach. This approach would provide the system designer with the ability to bias the system to require longer silences to conclude an end-of-utterance has occurred.

Referring to operation 408 in FIG. 4, the syllable duration model may have essentially any form that is suitable for this purpose, such as a histogram or other format described above.

Figure 5B:
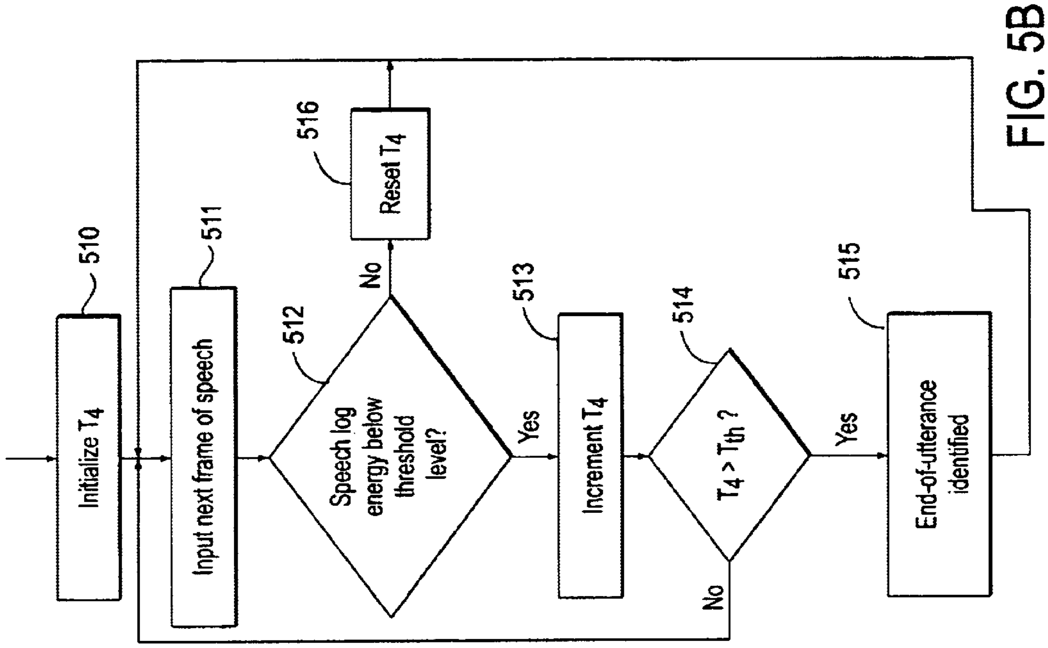
FIGS. 5A and 5B are flow diagrams showing in greater detail the process of FIG. 3, according to a second embodiment.
Figure 5A:
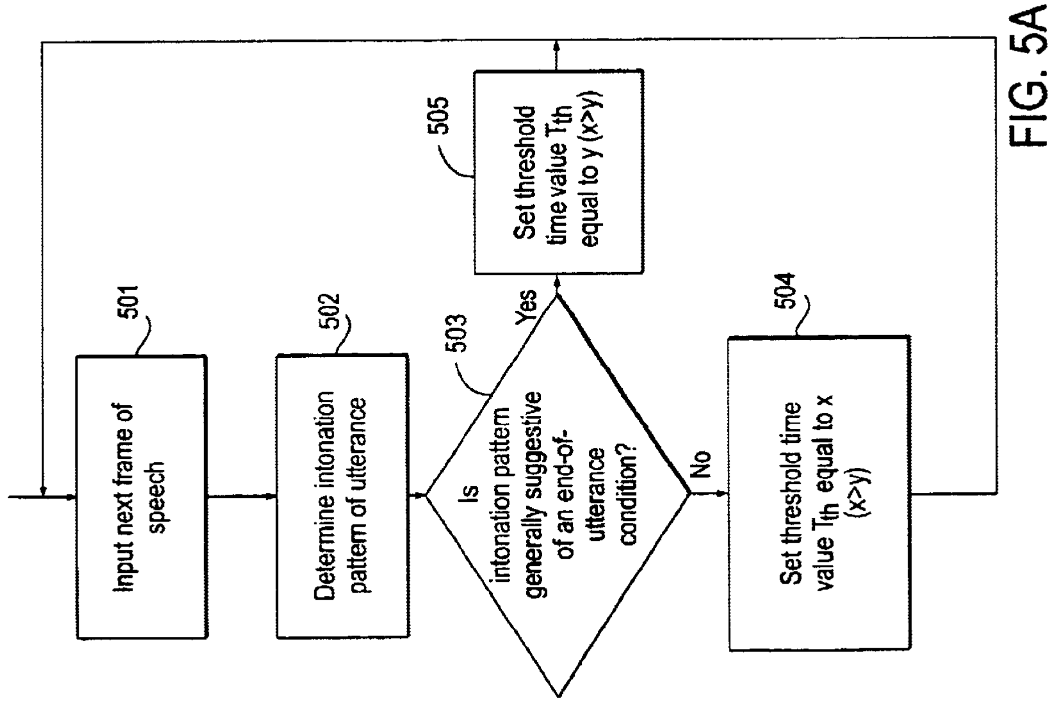

FIGS. 5A and 5B collectively represent another embodiment of the prosody based endpoint detection technique. The processes of FIGS. 5A and 5B may be performed concurrently. The process of FIG. 5A is for determining a threshold time value $T_{th}$, which is used in the process of FIG. 5B to identify an end-of-utterance condition. Specifically, the threshold time value $T_{th}$ determines how long the endpoint detector will wait, in response to detecting the input signal's log energy has fallen below a threshold level, before determining an end-of-utterance has occurred.

Referring first to FIG. 5A, initially the next frame of speech representing an utterance is input at 501. At 502, the intonation pattern of the utterance is determined, such as in the manner described above. At 503, a determination is made of whether the intonation pattern is generally suggestive of (e.g., in terms of probability) an end-of-utterance condition. This determination 503 may be made in the manner described above. If the intonation of the utterance is determined at 503 to be suggestive of an end-of-utterance condition, then at 505 the threshold time value $T_{th}$ is set equal to a predetermined time value y. If not, then at 504 the threshold time value $T_{th}$ is set equal to a predetermined time value x, which is larger than (represents longer duration than) time value y. The specific values for x and y can depend upon various factors, such as the particular application of the system, the desired performance, etc.

Referring now to FIG. 5B, a timer variable $T_4$ is initialized to zero at 510, and at 511 the next frame of speech is input. At 512, a determination is made of whether the log energy of the speech has dropped below the threshold level. If not, $T_4$ is reset to zero at 516, and the process then repeats from 511. If the signal has dropped below the threshold level, then at 513 $T_4$ is incremented. Next, at 514 $T_4$ is compared to the threshold time value $T_{th}$ determined in the process of FIG. 5A. If $T_4$ exceeds $T_{th}$, then at 515 an end-of-utterance condition is identified, and the process repeats from 510. Otherwise, an end-of-utterance condition is not yet identified, and the process repeats from 511. Many variations upon these processes are possible without altering the basic approach, such as changing the ordering of the above-noted operations.

Thus, a method and apparatus for detecting endpoints of speech using prosody have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of operating an endpoint detector for speech recognition, the method comprising:

inputting speech representing an utterance;

determining that a value of the speech has dropped below a threshold value;

computing an intonation of the utterance;

referencing the intonation of the utterance against an intonation model to determine a first end-of-utterance probability;

determining a period of time that has elapsed since the value of the speech dropped below the threshold value;

referencing the period of time against an elapsed time model to determine a second end-of-utterance probability;

computing an overall end-of-utterance probability as a function of the first and second end-of-utterance probabilities; and determining whether an end-of-utterance has occurred based on the overall end-of-utterance probability.

2. A method as recited in claim 1, wherein said computing an intonation of the utterance comprises computing an intonation of the utterance by determining the fundamental frequency of the utterance as a function of time.

3. A method as recited in claim 2, further comprising:

determining a duration of a final syllable of the utterance; and, referencing the duration of the final syllable against a syllable duration model to determine a third end-of-utterance probability;

wherein said computing an overall end-of-utterance probability comprises computing the overall end-of-utterance probability as a function of the first, second, and third end-of-utterance probabilities.

4. A method of operating an endpoint detector for speech recognition, the method comprising:

inputting speech representing an utterance;

computing an intonation of the utterance;

referencing the intonation of the utterance against an intonation model to determine a first end-of-utterance probability;

determining a duration of a final syllable of the utterance;

referencing the duration of the final syllable against a syllable duration model to determine a second end-of-utterance probability;

computing an overall end-of-utterance probability as a function of the first and second end-of-utterance probabilities; and determining whether an end-of-utterance has occurred based on the overall end-of-utterance probability.

5. A method as recited in claim 4, wherein said computing an intonation of the utterance comprises computing an intonation of the utterance by determining the fundamental frequency of the utterance as a function of time.

6. A method as recited in claim 4, further comprising:

determining that a value of the speech has dropped below a threshold value;

determining a period of time that has elapsed since the value of the speech dropped below the threshold value; and referencing the period of time against an elapsed time model to determine a second end-of-utterance probability;

wherein said computing an overall end-of-utterance probability comprises computing the overall end-of-utterance probability as a function of the first, second, and third end-of-utterance probabilities.

7. A method of operating an endpoint detector for speech recognition, the method comprising:

inputting speech representing an utterance, the utterance having a time-varying fundamental frequency;

determining that a value of the speech has drooped below a threshold value;

computing an intonation of the utterance by determining the fundamental frequency of the utterance as a function of time;

referencing the intonation of the utterance against an intonation model to determine a first end-of-utterance probability;

determining a period of time that has elapsed since a value of the speech dropped below the threshold value;

referencing the period of time against an elapsed time model to determine a second end-of-utterance probability;

determining a duration of a final syllable of the utterance;

referencing the duration of the final syllable against a syllable duration model to determine a third end-of-utterance probability;

computing an overall end-of-utterance probability as a function of the first, second, and third end-of-utterance probabilities; and determining whether an end-of-utterance has occurred by comparing the overall end-of-utterance probability to a threshold probability.

8. An apparatus for performing endpoint detection comprising:

means for inputting speech representing an utterance, the utterance having a time-varying fundamental frequency;

means for determining that a value of the speech has dropped below a threshold value;

means for computing an intonation of the utterance by determining the fundamental frequency of the utterance as a function of time;

means for referencing the intonation of the utterance against an intonation model to determine a first end-of-utterance probability;

means for determining a period of time that has elapsed since the speech dropped below the threshold value;

means for referencing the period of time against an elapsed time model to determine a second end-of-utterance probability;

means for computing the duration of the final syllable of the utterance against a syllable duration model to determine a third end-of-utterance probability;

means for determining an overall end-of-utterance probability as a function of the first, second, and third end-of-utterance probabilities; and means for determining whether an end-of-utterance has occurred by comparing the overall end-of-utterance probability to a threshold probability.

* * * * *